(12) United States Patent
Schneider

(10) Patent No.: US 7,877,570 B2
(45) Date of Patent: Jan. 25, 2011

(54) CONSOLIDATION OF MATCHING MEMORY PAGES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 759 days.

(21) Appl. No.: 11/893,269

(22) Filed: Aug. 14, 2007

(65) Prior Publication Data

US 2009/0049271 A1 Feb. 19, 2009

(51) Int. Cl.
G06F 12/00 (2006.01)
G06F 21/00 (2006.01)
G06F 13/00 (2006.01)
G06F 13/28 (2006.01)
G06F 9/26 (2006.01)
G06F 9/34 (2006.01)

(52) U.S. Cl. .......................... 711/202; 711/6; 711/147; 711/203; 711/208; 711/216; 711/E12.06; 711/E12.059

(58) Field of Classification Search .................. None
See application file for complete search history.

(56) References Cited

U.S. PATENT DOCUMENTS 6,075,938 A * 6/2000 Bugnion et al. ............... 703/27
6,233,668 B1 * 5/2001 Harvey et al. ............... 711/206
6,789,156 B1 * 9/2004 Waldspurger ................. 711/6
6,880,022 B1 * 4/2005 Waldspurger et al. .......... 710/9

OTHER PUBLICATIONS

Ulrich Neumerkel et al.,"Mergemem extended abstract for application at the Augsburg Linux-Kongress 1999", Jun. 15, 1999, 2 pages.*
Edouard Bugnion, Scott Devine, Kinshuk Govil, Mendel Rosenblum, Disco: running commodity operating systems on scalable multiprocessors, ACM Transactions on Computer Systems (TOCS), v.15 n.4, p. 412-447, Nov. 1997.*

* cited by examiner

Primary Examiner—Matt Kim
Assistant Examiner—Michael Alsip
(74) Attorney, Agent, or Firm—Blakely, Sokoloff, Taylor & Zafman LLP

(57) ABSTRACT

A method and apparatus for managing memory allocation using memory pages. A first physical memory page is compared with a second physical memory page, wherein the first physical memory page is associated with a first page table and the second physical memory page is associated with a second page table. If the second physical memory page matches the first physical memory page, the second physical memory page is deallocated, and the second page table is associated with the first physical memory page.

20 Claims, 6 Drawing Sheets

CONSOLIDATION OF MATCHING MEMORY PAGES

TECHNICAL FIELD

Embodiments of the present invention relate to memory management, and more particularly, to page oriented memory management.

BACKGROUND

A component included in all computing devices is memory. A device's main memory (e.g., RAM, flash, etc.) provides storage that can be quickly written to and read from by a processor. Main memory is allocated to an operating system and programs during runtime (throughout the duration of execution). When a program terminates, memory allocated to that program is freed (deallocated), and may subsequently be allocated to a different program.

Frequently, data that is stored in main memory does not change once it has been written. For example, when process code of a program or operating system is loaded into memory (thus initiating a process), much of the process code includes instructions and data structures that will not change for the life of the process.

Often, multiple instances of the same program (application) are run concurrently. When multiple instances of a program are run concurrently, it is preferable to share as much physical memory between the multiple instances as possible. This may be accomplished by having virtual memory space of each instance map to the same blocks of physical memory (e.g., physical memory pages).

There are two conventional methods of sharing physical memory between multiple instances of a program. In a first conventional method, an operating system can require that processes identify which blocks of memory are likely to change, and which blocks of memory are never going to change. An operating system may then allow the blocks of memory that will never change to be shared between different instances of a program.

In a second conventional method, the operating system can allocate all data to memory designated as read only memory (whether the data is expected to change or not). All memory is initially shared between multiple instances of a program. When a process attempts to write to the memory, a copy of the page that is being written to is generated. This copy of the original memory page is placed into the virtual memory space of the process (application instance) that attempted to write to the memory page to replace the original memory page. For example, two instances of the same application may each initially share 65 memory pages. If the first instance of the application attempts to write to memory page 55 (e.g., to update data), to ensure that the change affects only the first instance of the process, the operating system copies the contents of page 55 into a free physical memory page. The operating system then changes a mapping of the first instance of the application so that the virtual memory space now maps page 55 to the freshly allocated physical memory page. The first instance may then successfully write to the freshly allocated memory page. After this series of events, the two instances may share memory pages 1-54 and 56-65, and each may now have a different memory page 55 that is not shared. Therefore a total of 66 memory pages may subsequently be used.

Frequently, when a process is started up, it writes to a collection of data structures that were just loaded into memory as it initializes itself. It is likely that different instances of a program will write significant portions of the same data. Therefore, multiple instances will end up having their own copy of the same data stored in different physical memory pages. This may consume unnecessary amounts of memory.

BRIEF DESCRIPTION OF THE DRAWINGS

The present invention is illustrated by way of example, and not by way of limitation, in the figures of the accompanying drawings and in which.

DETAILED DESCRIPTION

Figure 1:
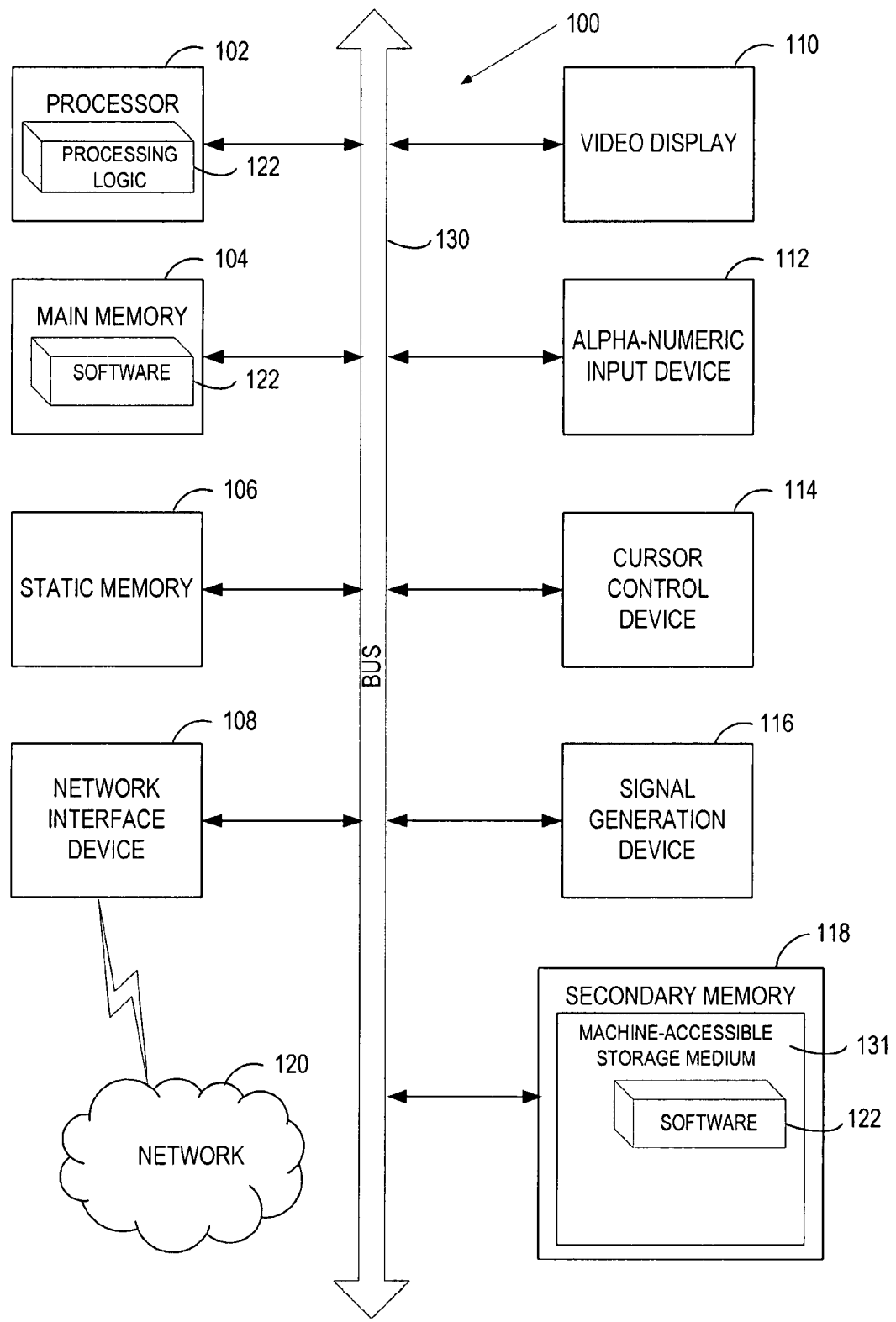
FIG. 1 illustrates a diagrammatic representation of a machine in the exemplary form of a computer system, in accordance with one embodiment of the present invention.

Described herein is a method and apparatus for managing memory allocation using memory pages. In one embodiment, a first physical memory page is compared with a second physical memory page. The comparison may include generating a first hash value of the first physical memory page and a second hash value of the second physical memory page. If the first hash value matches the second hash value, a binary comparison may be performed between the first physical memory page and the second physical memory page. The first physical memory page may be associated with a first page table, and the second physical memory page may be associated with a second page table. If the second physical memory page matches the first physical memory page, the second physical memory page may be deallocated, and the second page table may be associated with the first physical memory page. In one embodiment, the second page table is associated with the first physical memory page in the second page table.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates a diagrammatic representation of a machine in the exemplary form of a computer system 100 within which a set of instructions, for causing the machine to perform any one or more of the methodologies discussed herein below, may be executed. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 100 includes a processing device (processor) 102, a main memory 104 (e.g., read-only memory (ROM), flash memory, dynamic random access memory (DRAM) such as synchronous DRAM (SDRAM) or Rambus DRAM (RDRAM), etc.), a static memory 106 (e.g., flash memory, static random access memory (SRAM), etc.), and a secondary memory 118 (e.g., hard disk drive, optical drive, etc.), which communicate with each other via a bus 130.

Processor 102 represents one or more general-purpose processing devices such as a microprocessor, central processing unit, or the like. More particularly, the processor 102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 102 may also be one or more special-purpose processing devices such as an application specific integrated circuit (ASIC), a field programmable gate array (FPGA), a digital signal processor (DSP), network processor, or the like. The processor 102 is configured to execute the processing logic 126 for performing the operations and steps discussed herein below.

The computer system 100 may further include a network interface device 108. The computer system 100 also may include a video display unit 110 (e.g., a liquid crystal display (LCD) or a cathode ray tube (CRT)), an alphanumeric input device 112 (e.g., a keyboard), a cursor control device 114 (e.g., a mouse), and a signal generation device 116 (e.g., a speaker).

The secondary memory 118 may include a machine-accessible storage medium 131 on which is stored one or more sets of instructions (e.g., software 122) embodying any one or more of the methodologies or functions described herein. The software 122 may also reside, completely or at least partially, within the main memory 104 and/or within the processor 102 during execution thereof by the computer system 100, the main memory 104 and the processor 102 also constituting machine-accessible storage media. The software 122 may further be transmitted or received over a network 120 via the network interface device 108.

In one embodiment of the present invention, at least a portion of the main memory 104 is managed memory. Managed memory is allocated and deallocated according to the needs of one or more applications (programs) and/or an operating system. Means for managing portions of main memory 104 may be implemented in hardware, software, or a combination thereof. The memory management means may be responsible for assigning (allocating) and freeing (deallocating) portions of main memory 104, and/or for making calls to the general purpose memory allocation library that do so. Embodiments of the present invention may be incorporated into a general purpose memory allocation library.

While secondary memory 118 and main memory 104 are each shown in an exemplary embodiment to be single mediums, each should be taken to include a single medium or multiple media (e.g., a centralized or distributed database, and/or associated caches, registers, etc.) that store the one or more sets of instructions.

Each of the main memory 104 and the secondary memory 118 may include a machine accessible storage medium, which shall be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 2:
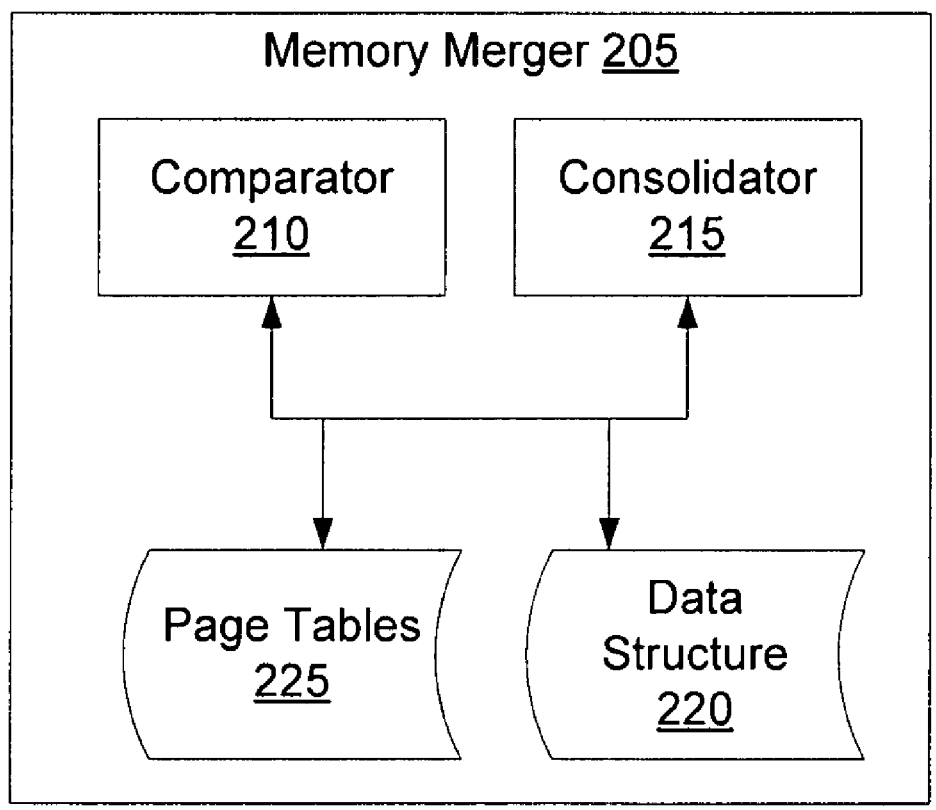
FIG. 2 illustrates a block diagram of one embodiment of a memory merger, which performs an aspect memory management.

FIG. 2 illustrates a block diagram of one embodiment of a memory merger 205, which performs an aspect of memory management. In one embodiment, memory merger 205 resides in computer system 100 of FIG. 1. In a further embodiment, the memory merger 205 is a component of a memory manager (not shown) that is responsible for assigning (allocating) and freeing (deallocating) portions of memory, and/or for making calls to a general purpose memory allocation library that do so. The memory manager, in turn, may reside in computer system 100 of FIG. 1. The memory merger 205 may be implemented in hardware, software, or a combination thereof. In one embodiment, the memory merger 205 manages at least portions of the main memory 104 of FIG. 1.

Referring to FIG. 2, in one embodiment, the memory merger 205 includes a comparator 210, a consolidator 215, one or more page tables 225 and a data structure 220.

When a program (application) is initiated (loaded into memory), virtual memory pages are created for the program. Each of those virtual memory pages may be mapped to a physical memory page via one or more memory page tables. An instance of the program may then be loaded into memory (e.g., into those physical memory pages mapped to the program or application). Often, a program may have multiple instances loaded into memory. Each instance may have its own virtual address space (and its own page table or page tables), and be mapped to a separate portion of physical memory. Multiple instances of a single program may have one or more identical memory pages. Such duplicate memory pages may be merged by memory merger 205 to increase available memory capacity.

In addition to different instances of a program having duplicate memory pages, instances of different programs may also include duplicate memory pages. This may occur, for example, if different programs are using the same library functions. Duplicate pages of different applications may also be merged by memory merger 205 to increase available memory capacity.

Each of the page tables 225 associates physical addresses (e.g., of physical memory pages) with virtual addresses (e.g., of virtual memory pages). In one embodiment, each physical address and each virtual address include a page number and an offset into the page. The size of the memory pages may be architecture and operating system dependent. In one embodiment, each of the memory pages has a size of 4 kB (4,096 bytes). Alternatively, the memory pages may be 2 kB, 8 kB, 16 kB, etc., depending on the machine and/or system on which they reside.

Comparator 210 compares physical memory pages to find duplicates. In one embodiment, comparator 210 performs a binary comparison between each physical memory page. In another embodiment, comparator 210 performs a two tier comparison for optimal performance. In the two tier comparison, one or more physical memory pages are checked at a time using a first check. The first check may include generating a hash value (or other signature value) for each checked memory page, and comparing the generated hash values (or other signature values). In other embodiments, comparator 210 may perform three tier, four tier, etc., comparisons. For example, a first check may include generating and comparing simple hash values, a second check may include generating and comparing more complicated hash values for memory pages having matching simple hash values, and a third check may include performing a binary comparison on memory pages having matching hash values of intermediate to high complexity.

A first check (e.g., for the two tier comparison, three tier comparison, etc.) may include generating and comparing simple hash values or other simple signature values. Examples of simple hash values include a bloom filter, a modulo by prime hash, an FNV hash, etc. In one embodiment, the first check includes performing cyclic redundancy checks (an error detection mechanism in which a block of data is divided by some predefined polynomial to generate a remainder) on the memory pages. In another embodiment, the first check includes generating checksums (a numerical value calculated from the contents of a block of data) of the memory pages. Optimally, the first check should be quick and easy so as to take up a minimum of processing power.

A first, second, or subsequent check may include generating hash value having a medium to high complexity. More complex hash values have fewer collisions, but generally require more memory to store, and more processor power to generate than simple hash values. Examples of hashes having a medium complexity include cyclic redundancy check 16 (CRC-16) and CRC-32. Examples of high complexity hashes include cryptographic hash functions (a function that takes an input of arbitrary length and generates a fixed length output from which it is difficult to deduce the input) such as SHA-1, SHA-256, MD5, or RIPEMD-160.

Hash values may be stored in data structure 220 along with identifiers of the physical memory page for which they were calculated. In one embodiment, memory pages having identical hash values are grouped together in the data structure 220 (e.g., data structure is keyed to hash values). For example, each hash value may represent a bin, and every memory page having a hash value may be placed in the appropriate bin corresponding to that hash value.

If two hash values do not match, then the memory pages associated with those hash values are not identical. However, if two memory pages have matching hash values, it is possible that those memory pages have identical contents. Therefore, once a sufficient number of memory pages have been checked, memory pages having the same hash values may be more thoroughly compared via a second check (or a third check, fourth check, etc.).

The second check (or third check, fourth check, etc.) of the two tier comparison may include a thorough comparison between physical memory pages having matching hash values. In one embodiment, the second check is performed after hash values have been generated for all memory pages of a particular process or processes. In another embodiment, the second check is performed after hash values have been generated for all physical memory pages (e.g., memory pages of all processes). In yet another embodiment, the second check is performed as soon as two memory pages having matching hash values are detected. Alternatively, some other criteria may be used to determine when to perform the second check (e.g., based on a number of memory pages checked, based on a time interval, etc.).

In one embodiment, the second check includes a binary comparison performed between memory pages having matching hash values. The binary comparison checks whether each bit in one memory page matches a corresponding bit in another memory page. If all bits match up, then the compared memory pages are identical. In one embodiment, each hash bin is checked in sequence. A binary comparison may then be performed between each memory page sharing a hash bin.

Consolidator 215 operates on matching physical memory pages (e.g., those that are identical). If two memory pages are found to be identical, consolidator 215 combines the identical memory pages into a single memory page, thus freeing up memory. In one embodiment, consolidator 215 deallocates all but one memory page having identical contents (deletes all duplicates). Deallocating a memory page may include making the memory page available to be used by another process or application and/or deleting contents of the memory page.

Page tables 225 that include the deallocated memory page may be updated before, concurrent to, or after the deallocation. Updating the page tables 225 may include replacing all references to the deallocated physical memory page(s) (or pages to be deallocated) with references to the non-deallocated matching memory page. Thereby, memory may be freed with no loss of data.

The comparator 210 and consolidator 215 may operate as low priority processes. Therefore, they may not operate if any processes are in a ready to run state. This permits memory to be compared and/or freed without causing noticeable impairment to other processes. In one embodiment, the comparator 210 and consolidator 215 have a higher priority than an idle process.

Figure 3A:
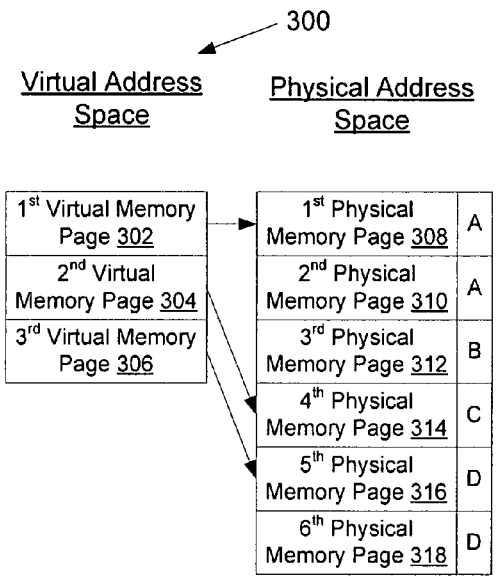
FIG. 3A shows a first exemplary page table, in accordance with one embodiment of the present invention.

FIGS. 3A-3D illustrate exemplary page tables, in accordance with embodiments of the present invention. Referring to FIG. 3A, a first exemplary page table 300 is shown, in accordance with one embodiment of the present invention. The first page table 300 may be associated with a first instance of a program (application). The first page table maps a virtual address space of the first instance of the program to a physical address space. As shown, a first virtual memory page 302 is mapped to a first physical memory page 308, a second virtual memory page 304 is mapped to a fourth physical memory page 314, and a third virtual memory page 306 is mapped to a fifth physical memory page 316. The first physical memory page 308 has a value of A, the fourth physical memory page 314 has a value of C, and the fifth physical memory page 316 has a value of D, where A-D each indicate different compositions of data.

Figure 3B:
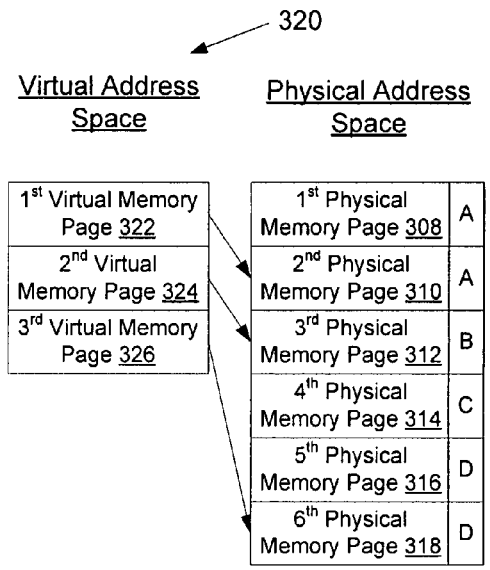
FIG. 3B shows a second exemplary page table, in accordance with one embodiment of the present invention.

FIG. 3B shows a second exemplary page table 320, in accordance with one embodiment of the present invention. The second page table 320 may be associated with a second instance of a program (the first instance of which is shown in FIG. 3A). The second page table 320 maps a virtual address space of the second instance of the program to the physical address space. As shown, a first virtual memory page 322 of the second instance is mapped to a second physical memory page 310, a second virtual memory page 324 is mapped to a third physical memory page 312, and a third virtual memory page 326 is mapped to a sixth physical memory page 318. The second physical memory page 310 has a value of A, the third physical memory page 312 has a value of B, and the sixth physical memory page 318 has a value of D. As illustrated, the first physical memory page 308 and second physical memory page 310 have identical contents, and the fifth physical memory page 316 and sixth physical memory page 318 have identical contents.

Figure 3C:
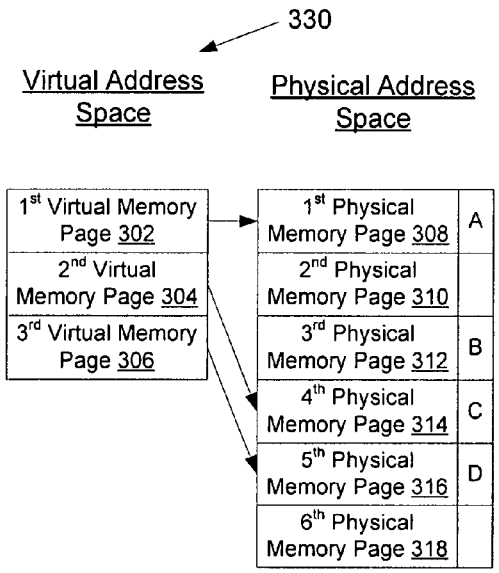
FIG. 3C shows a first exemplary page table, in accordance with another embodiment of the present invention.

FIG. 3C shows a first exemplary page table 330, in accordance with another embodiment of the present invention. The first page table 330 reflects the first page table 300 after identical physical memory pages have been consolidated. In one embodiment, consolidation is accomplished using the memory merger 205 of FIG. 2. Alternatively, other means of memory consolidation may be used.

Figure 3D:
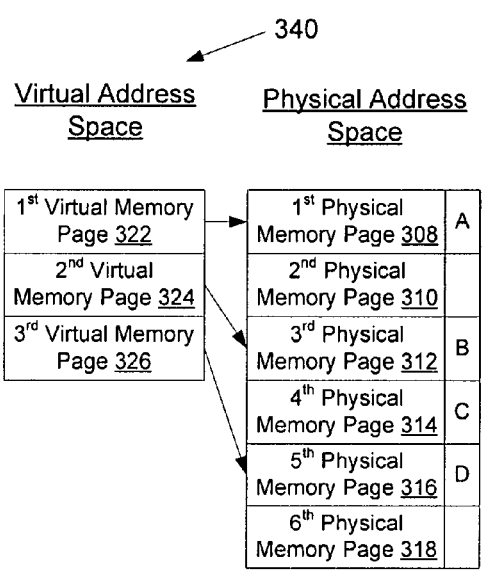
FIG. 3D shows a second exemplary page table, in accordance with another embodiment of the present invention.

FIG. 3D shows a second exemplary page table 340, in accordance with another embodiment of the present invention. The second page table 340 reflects the second page table 320 after identical physical memory pages have been consolidated. As illustrated, second page table 340 has been updated such that the first virtual memory page 322 now maps to the first physical memory page 308 and the third virtual memory page 326 now maps to the fifth physical memory page 316. Thus, the second physical memory page 310 and the sixth physical memory page 318 have been freed. Moreover, the first virtual memory page 302 of FIG. 3C and the first virtual memory page 322 of FIG. 3D now share the first physical memory page 308. Likewise, the third virtual memory page 306 of FIG. 3C and the third virtual memory page 326 of FIG. 3D now share the fifth physical memory page 316. In one embodiment, consolidation is accomplished using the memory merger 205 of FIG. 2. Alternatively, other means of memory consolidation may be used.

Figure 4:
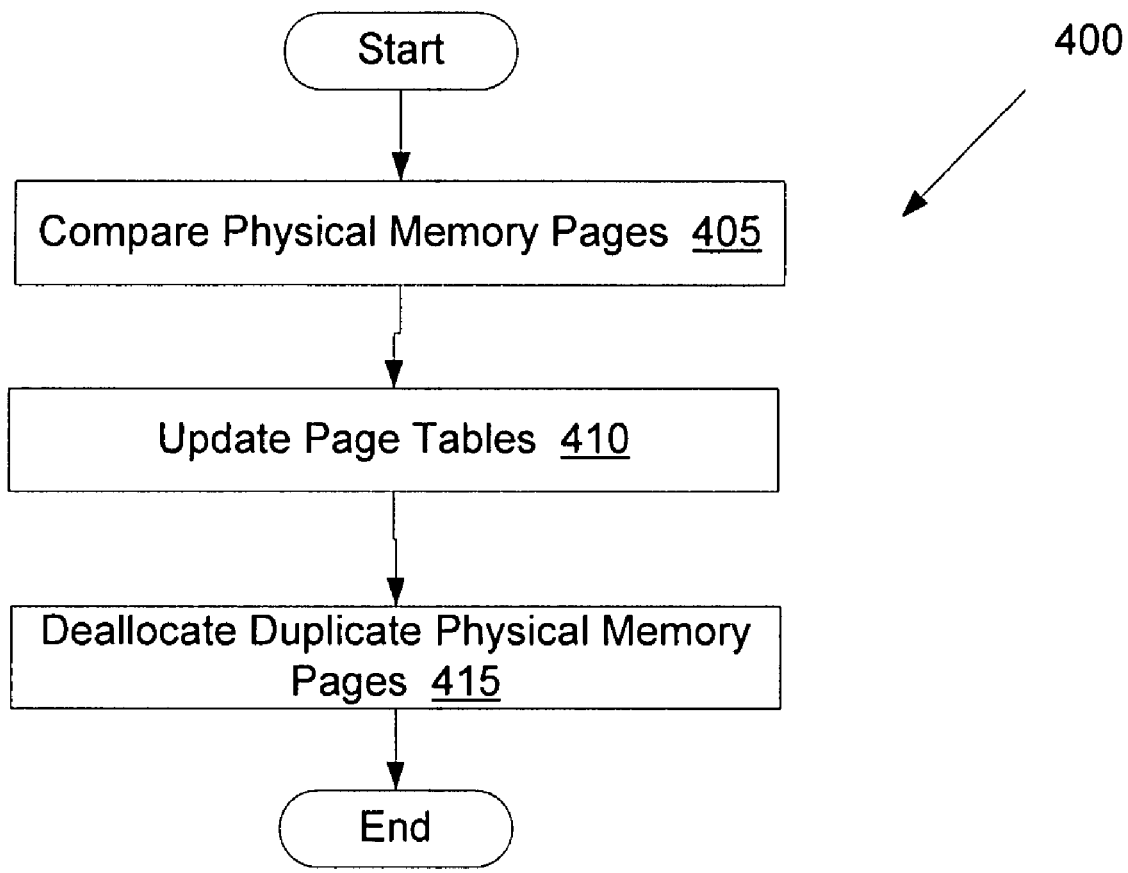
FIG. 4 illustrates a flow diagram of one embodiment for a method of consolidating memory pages.

FIG. 4 illustrates a flow diagram of one embodiment for a method 400 of consolidating memory pages. The method may be performed by processing logic that may comprise hardware (e.g., circuitry, dedicated logic, programmable logic, microcode, etc.), software (such as instructions run on a processing device), or a combination thereof. In one embodiment, method 400 is performed by memory merger 205 of FIG. 2.

Method 400 may be performed as a low priority process. As such, method 400 may be performed when no programs are in a ready to run state.

Referring to FIG. 4, method 400 begins with processing logic comparing physical memory pages (block 405). Comparing physical memory pages may include comparing hash values of physical memory pages and/or performing binary comparisons between physical memory pages. At block 410, page tables associated with duplicate memory pages are updated. Updating may include removing an association between duplicate memory pages and page tables. Updating may further include replacing the removed association with an association between the page table and a physical memory page that is identical to the duplicate physical memory page. At block 415, duplicate physical memory pages are deallocated.

Figure 5:
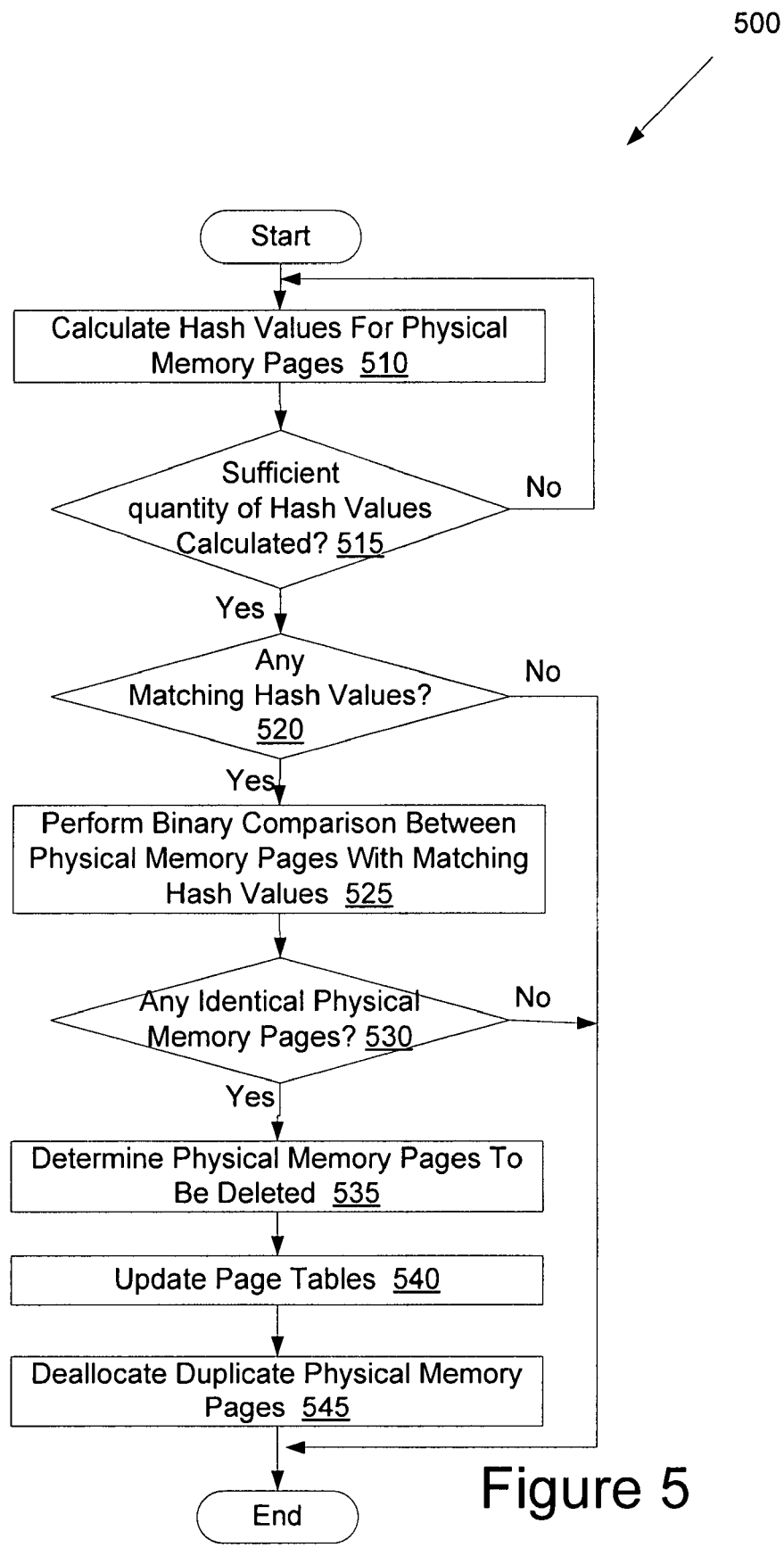
FIG. 5 illustrates a flow diagram of another embodiment for a method of consolidating memory pages.

FIG. 5 illustrates a flow diagram of another embodiment for a method 500 of consolidating memory pages. The method may be performed by processing logic that may comprise hardware (e.g., circuitry, dedicated logic, programmable logic, microcode, etc.), software (such as instructions run on a processing device), or a combination thereof. In one embodiment, method 500 is performed by memory merger 205 of FIG. 2.

Referring to FIG. 5, method 500 begins with processing logic processing logic calculating hash values for one or more physical memory pages (block 510). Calculated hash values may be stored in a data structure that associates hash values with physical memory pages from which they were generated. In one embodiment, each hash value represents a bin. If multiple physical memory pages have the same hash value, then the bin will include an entry for each such physical memory page. Alternatively, different means of associating physical memory pages with hash values in a data structure may be used.

At block 515, processing logic determines whether a sufficient quantity of hash values have been calculated. In one embodiment, a sufficient quantity of hash values are calculated when a hash value has been generated for every physical memory page. In another embodiment, a sufficient quantity of hash values have been calculated when hash values have been generated for all memory pages associated with page tables of all instances of a program or application. Alternatively, a number of hash values may be considered sufficient when other criteria are met. If enough hash values have been calculated, the method proceeds to block 520. If not enough hash values have been calculated, the method continues to block 510.

At block 520, processing logic determines whether there are any matching hash values. If there are matching hash values, the method continues to block 525. If there are not matching hash values, the method ends.

At block 525, a binary comparison is performed between physical memory pages that have matching hash values. Therefore, for example, if a first physical memory page and a second physical memory page have matching hash values, a binary comparison will be performed between them.

At block 530, processing logic determines whether any identical physical memory pages have been found. Identical physical memory pages are found when the binary comparison shows that two physical memory pages contain exactly the same information. If any identical physical memory pages have been found, the method proceeds to block 535. If no identical physical memory pages have been found, the method ends.

At block 535, processing logic determines which physical memory pages are to be deallocated. If, for example, three physical memory pages were found to match, then two of those physical memory pages would be marked to be deallocated.

At block 540, page tables are updated. Updating the page tables includes replacing all references to the memory pages to be deallocated with references of the matching physical memory pages that are not to be deleted. Therefore, for example, if a first physical memory page and second physical memory page are found to match, and the second physical memory page is to be deallocated, then a page table that included the second physical memory page would be updated to instead include reference to the first physical memory page.

At block 545, duplicate physical memory pages are deallocated. The method then ends.

Figure 6:
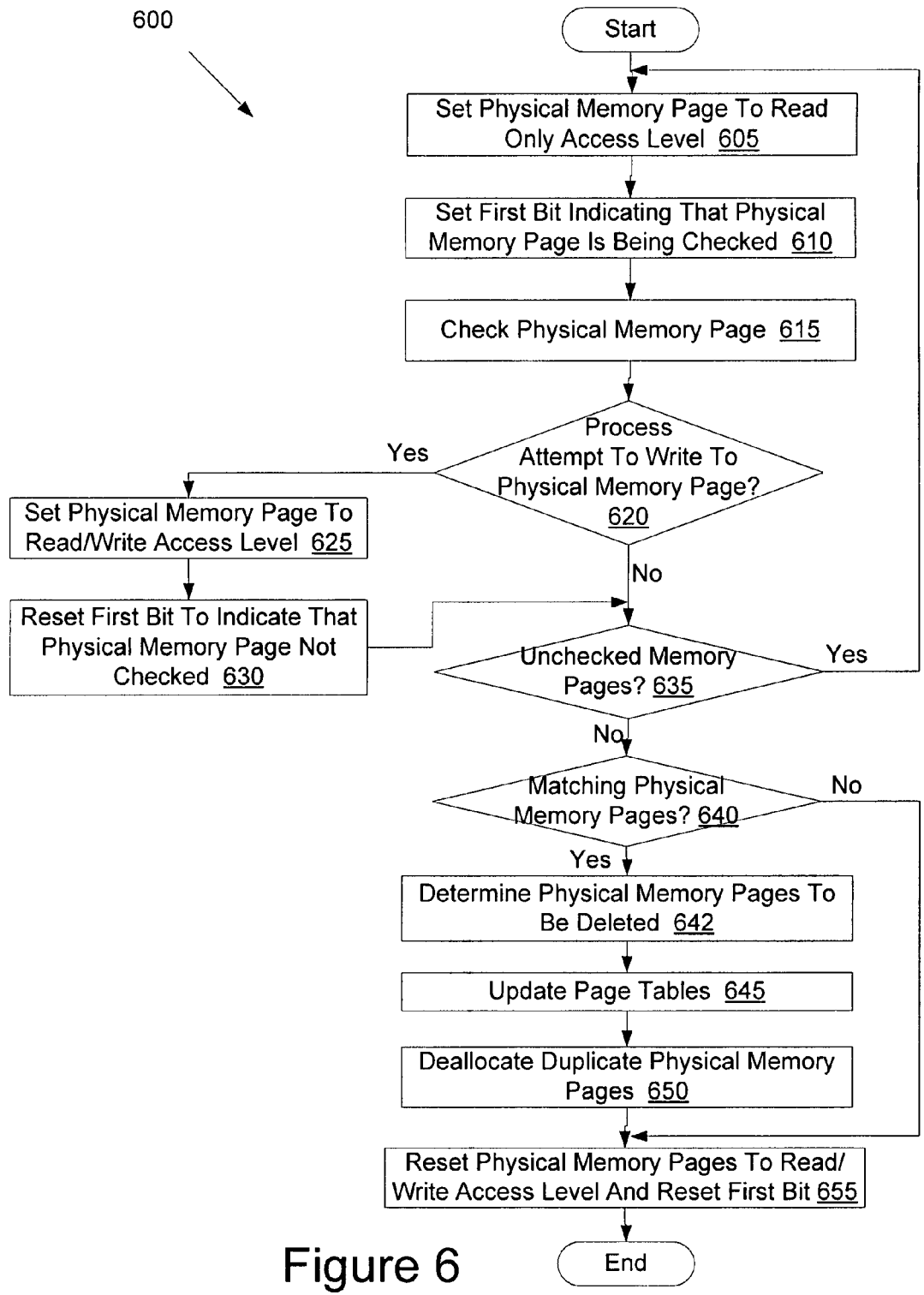
FIG. 6 illustrates a flow diagram of yet another embodiment for a method of consolidating memory pages.

FIG. 6 illustrates a flow diagram of yet another embodiment for a method 600 of consolidating memory pages. The method may be performed by processing logic that may comprise hardware (e.g., circuitry, dedicated logic, programmable logic, microcode, etc.), software (such as instructions run on a processing device), or a combination thereof. In one embodiment, method 600 is performed by memory merger 205 of FIG. 2. In one embodiment, method 600 is performed on physical memory pages that have a read/write access level. Alternatively, method 600 is performed on both physical memory pages having a read/write access level and on physical memory pages having a read only access level.

Referring to FIG. 6, method 600 begins with setting a physical memory page to a read only state (block 605). A physical memory page may be set to a read only state by setting a bit of a page table or page tables that include the physical memory page to indicate that the physical memory page cannot be updated while the physical memory page is being checked (e.g., compared).

In one embodiment, in which physical memory pages having both read only access levels and read/write access levels are checked, there are two bits that indicate whether the physical memory page has a read only access level. A first read only bit is left unchanged by method 600. Therefore, if a physical memory page had a ready only access level prior to being checked, the first read only bit would retain its read only access level. However, if the physical memory page had a read/write access level, the first read only bit would continue to have a read/write access level. The second read only bit is always set to read only when a physical memory page is being checked. The use of two read only bits enables a process to retain information on both the present access level of the physical memory page and the previous access level of the physical memory page.

At block 610, an examination bit that indicates that the physical memory page is being checked is set. The examination bit may be set in a page table or page tables that include the physical memory page (e.g., in an entry of the physical memory page in the page table). When the examination bit is set, this ensures that a proper sequence of events occurs if a process attempts to write to the physical memory page while it is being checked. In one embodiment, the examination bit corresponds to the second read only bit described above. Therefore, when the examination bit is set, the physical memory page may have a read only access level.

At block 615, the physical memory page is checked. Checking the physical memory page may include generating a hash value for the physical memory page. Calculated hash values may be stored in a data structure that associates hash values with physical memory pages from which they were generated.

At block 620, processing logic determines whether any process is attempting to write to the physical memory page. Block 620 represents an interrupt that may be performed at any point during method 600. Therefore, block 620 may be initiated, for example, after block 635, after block 605, etc. If a process is attempting to write to the physical memory page, the method proceeds to block 625. If no process is attempting to write to the physical memory page, the method proceeds to block 635 (or a different subsequent processing block).

At block 625, the physical memory page that a process attempted to write to is set to a read/write access level (e.g., the read only bit or read only bits are reset). At block 630, the examination bit is reset to indicate that the physical memory page is no longer being checked. The process may then write to the physical memory page. The physical memory page is then in an unchecked state, and may need to subsequently be checked again. The method proceeds to block 635.

At block 635, processing logic determines whether there are any unchecked physical memory pages. Alternatively, processing logic may determine whether there are a sufficient number of checked physical memory pages (e.g., all physical memory pages, physical memory pages of a particular process or processes, etc.). If unchecked physical memory pages remain (or not enough physical memory pages have been checked), the method proceeds to block 605. If all physical memory pages have been checked (or enough physical memory pages have been checked), the method continues to block 640.

At block 640, processing logic determines whether there are any matching physical memory pages. This may be accomplished by performing a thorough comparison between physical memory pages that have matching hash values. In one embodiment, determining whether there are any matching physical memory pages includes performing a binary comparison between physical memory pages having matching hash values. If there are no matching physical memory pages, the method ends. If there are matching physical memory pages, the method continues to block 642.

At block 642, it is determined which physical memory pages are to be deallocated. If, for example, three physical memory pages were found to match, then two of those physical memory pages could be marked to be deallocated.

At block 645, page tables are updated. Updating the page tables includes replacing all references to the memory pages to be deallocated with references of the matching physical memory pages that are not to be deallocated. Therefore, for example, if a first physical memory page and second physical memory page are found to match, and the second physical memory page is to be deallocated, then a page table that includes the second physical memory page would be updated to instead include reference to the first physical memory page.

At block 650, duplicate memory pages are deallocated. At block 655, unconsolidated physical memory pages (those for which no matching physical memory pages were found) are reset to a read/write access level. Alternatively, the physical memory pages may be returned to a previous access level that they had before being checked (whether read/write or read only). In either case, the examination bit of all physical memory pages may be reset to indicate that the physical memory pages are no longer being checked. The method then ends.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
    associating a first physical memory page with a first page table and a second physical page with a second page table, wherein the first page table comprises two bits to indicate a present access level and a previous access level of the first physical memory page;
    setting a first bit of the two bits to indicate that the present access level is a read only access level when the first physical memory page is being checked, wherein a second bit of the two bits indicates that the previous access level is set to a read only access level or a read and write access level;
    setting an examination bit to indicate that the first physical memory page is being checked;
    checking whether the first physical memory page matches the second physical memory page, wherein said checking comprises comparing the first physical memory page with the second physical memory page; and
    if the second physical memory page matches the first physical memory page, deallocating the second physical memory page, and associating the second page table with the first physical memory page.

2. The computer implemented method of claim 1, further comprising:
    removing an association between the second page table and the second physical memory page.

3. The computer implemented method of claim 1, wherein the comparing, the deallocating and the associating are performed by a system when no other process in the system is in a ready to run state.

4. The computer implemented method of claim 1, wherein the first page table is associated with a first instance of an application, and the second page table is associated with at least one of a second instance of the application and an instance of another application.

5. The computer implemented method of claim 1, further comprising:
    calculating a first hash value for the first physical memory page and a second hash value for the second physical memory page; and
    if the first hash value matches the second hash value, performing a binary comparison between the first physical memory page and the second physical memory page to determine whether the first physical memory page matches the second physical memory page.

6. The computer implemented method of claim 1 further comprising, if a process attempts to write to the first physical memory page while it is being checked:
    causing an exception when the second bit is set to the read and write access level, wherein the exception resets the first bit to indicate that the first physical memory page has the read and write access level, and resets the examination bit to indicate that the first physical memory page is no longer being checked; and
    rechecking the first physical memory page after it has been written to.

7. The computer implemented method of claim 1, further comprising:
    resetting the first physical memory page to the previous access level after said checking; and
    resetting the examination bit to indicate that the physical memory page is no longer being checked after said checking.

8. A non-transitory machine-accessible storage medium including instructions that, when executed by a machine, cause the machine to perform a computer implemented method comprising:
    associating a first physical memory page with a first page table and a second physical page with a second page table, wherein the first page table comprises two bits to indicate a present access level and a previous access level of the first physical memory page;
    setting a first bit of the two bits to indicate that the present access level is a read only access level when the first physical memory page is being checked, wherein a second bit of the two bits indicates that the previous access level is set to a read only access level or a read and write access level;
    setting an examination bit to indicate that the first physical memory page is being checked;
    checking whether the first physical memory page matches the second physical memory page, wherein said checking comprises comparing a first physical memory page with a second physical memory page;
    if the second physical memory page matches the first physical memory page, deallocating the second physical memory page, and associating the second page table with the first physical memory page.

9. The machine-accessible medium of claim 8, the method further comprising:
    removing an association between the second page table and the second physical memory page.

10. The machine-accessible medium of claim 8, wherein the comparing, the deallocating and the associating are performed by a system when no other process in the system is in a ready to run state.

11. The machine-accessible medium of claim 8, wherein the first page table is associated with a first instance of an application, and the second page table is associated with at least one of a second instance of the application and an instance of another application.

12. The machine-accessible medium of claim 8, the method further comprising:
    calculating a first hash value for the first physical memory page and a second hash value for the second physical memory page; and if the first hash value matches the second hash value, performing a binary comparison between the first physical memory page and the second physical memory page to determine whether the first physical memory page matches the second physical memory page.

13. The machine-accessible medium of claim 8, the method further comprising, if a process attempts to write to the first physical memory page while it is being checked:
causing an exception when the second bit is set to the read and write access level, wherein the exception resets the first bit to indicate that the first physical memory page has the read and write access level, and resets the examination bit to indicate that the first physical memory page is no longer being checked; and
rechecking the first physical memory page after it has been written to.

14. The machine-accessible medium of claim 8, the method further comprising:
resetting the first physical memory page to the previous access level after said checking; and
resetting the examination bit to indicate that the physical memory page is no longer being checked after said checking.

15. A computing system, comprising:
a storage device configured to store data in different physical memory pages, wherein a first physical memory page is associated with a first page table and a second physical memory page is associated with a second page table, wherein the first page table comprises two bits to indicate a present access level and a previous access level of the first physical memory page, and wherein a second bit of the two bits indicates that the previous access level is set to a read only access level or a read and write access level; and
a computing device, coupled to the storage device, wherein the computing device is configured to execute a memory merger configured to set a first bit of the two bits to indicate that the present access level is a read only access level when the first physical memory page is being checked, to set an examination bit to indicate that the first physical memory page is being checked, and to check whether the first physical memory page matches the second physical memory page, wherein the memory merger comprises:
a comparator to compare the first physical memory page with the second physical memory page; and
a consolidator to deallocate the second physical memory page and to associate the second page table with the first physical memory page if the comparator indicates that the second physical memory page matches the first physical memory page.

16. The computing system of claim 15, wherein the comparator is configured to calculate a first hash value for the first physical memory page and a second hash value for the second physical memory page, to store the first hash value and the second hash value in a data structure, and to perform a binary comparison between the first physical memory page and the second physical memory page if the first hash value matches the second hash value.

17. The computing system of claim 15, wherein the comparator is configured to remove an association between the second page table and the second physical memory page.

18. The computing system of claim 15, wherein the comparator is configured to compare, and the consolidator is configured to delete and associate, when no other process in the computing system is in a ready to run state.

19. The computing system of claim 15, wherein if a process attempts to write to the first physical memory page while it is being checked, the memory merger is configured to cause an exception when the second bit is set to the read and write access level, and to recheck the first physical memory page after it has been written to, wherein the exception resets the first bit to indicate that the first physical memory page has the read and write access level, and resets the examination bit to indicate that the first physical memory page is no longer being checked.

20. The computing system of claim 15, wherein the memory merger is configured to reset the first physical memory page to the previous access level after the first physical memory page is checked, and to reset the examination bit to indicate that the physical memory page is no longer being checked after the first physical memory page is checked.

* * * * *